United States Patent
Zhang

(10) Patent No.: US 10,964,024 B2
(45) Date of Patent: Mar. 30, 2021

(54) AUTOMATIC SIZING AND PLACEMENT OF TEXT WITHIN A DIGITAL IMAGE

(71) Applicant: Adobe Inc., San Jose, CA (US)

(72) Inventor: Pin Zhang, Kanagawa (JP)

(73) Assignee: Adobe Inc., San Jose, CA (US)

( * ) Notice: Subject to any disclaimer, the term of this patent is extended or adjusted under 35 U.S.C. 154(b) by 36 days.

(21) Appl. No.: 16/453,032

(22) Filed: Jun. 26, 2019

(65) Prior Publication Data

US 2020/0410686 A1 Dec. 31, 2020

(51) Int. Cl.
*G06T 7/11* (2017.01)
*G06T 7/194* (2017.01)
*G06T 11/60* (2006.01)

(52) U.S. Cl.
CPC .............. *G06T 7/11* (2017.01); *G06T 7/194* (2017.01); *G06T 11/60* (2013.01)

(58) Field of Classification Search
CPC ............ G06T 7/11; G06T 7/194; G06T 11/60
See application file for complete search history.

(56) References Cited

U.S. PATENT DOCUMENTS

| 10,049,477 B1* | 8/2018 | Kokemohr | G06T 11/60 |
| 2010/0053656 A1* | 3/2010 | Oota | G09B 21/008 |
| | | | 358/1.11 |
| 2010/0156919 A1* | 6/2010 | Bala | G06T 11/60 |
| | | | 345/582 |

* cited by examiner

*Primary Examiner* — Jon Chang
(74) *Attorney, Agent, or Firm* — Kilpatrick Townsend & Stockton LLP

(57) ABSTRACT

This disclosure involves the automatic sizing and placement of text within an image background. For example, a computing system obtains reference font size information for a font type to be applied to message text for display on a digital image. The computing system detects, within an image background of the digital image, a target region having proportions that enclose the message text based on the reference font size information. The computing system determines a target font size for the message text. The target font size allows the message text, when rendered in the font type at the target font size, to fit within the target region of the image background. The computing system generates a combined digital image by rendering the message text in the font type at the target font size within the target region of the image background.

20 Claims, 8 Drawing Sheets

AUTOMATIC SIZING AND PLACEMENT OF TEXT WITHIN A DIGITAL IMAGE

TECHNICAL FIELD

This disclosure generally relates to image editing. More specifically, but not by way of limitation, this disclosure relates to generating text in a font size suitable for placement at an identified position within a digital image.

BACKGROUND

Copy writers and other users who work on visual content creation have a constant need to place text onto images. To create aesthetically pleasing visual content, graphic designers select sizes and positions of text to appear on an image so as not to obscure the main objects of focus within the image. Traditionally, resizing and positioning of text within an image required diligent efforts by graphic designers to manually place the text onto the suitable position.

Techniques exist for automatically identifying and cutting out foreground objects in images. These techniques allow graphic designers to segment foreground objects from background regions within images. These techniques may enable graphic designers to more easily place text objects within the background of an image and avoid overlap of foreground objects of focus.

But these segmentation techniques do not address the need for identifying proper text position and font size within an image background. For instance, a random placement of text, even in an automatically identified background region, could result in either a font size that is too small to be seen or a font size that is so large that the rendered text exceeds the background region and obscures one or more foreground objects. Thus, even with existing techniques for identifying background and foreground objects within an image, sizing and placement of text within the image still requires manual efforts by a graphic designer.

SUMMARY

Certain embodiments involve generating text in a font size suitable for placement at an identified position within a digital image. For instance, a computing system obtains reference font size information for a font type to be applied to message text for display on a digital image. The reference font size information includes, for example, a ratio between a text height and width for the message text when the message text is rendered with the font type and a test font size. The message text rendered with the test font size is used, prior to updating the digital image to include the message text, within an algorithm for placing and sizing the message text. The computing system detects, within an image background of the digital image, a target region having proportions that enclose the message text based on the reference font size information. The computing system determines a target font size for the message text. The target font size allows the message text, when rendered in the font type at the target font size, to fit within the target region of the image background. The computing system generates a combined digital image by rendering the message text in the font type at the target font size within the target region of the image background.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features and embodiments of the present disclosure are better understood when the following Detailed Description is read with reference to the accompanying drawings.

DETAILED DESCRIPTION

Figure 1:
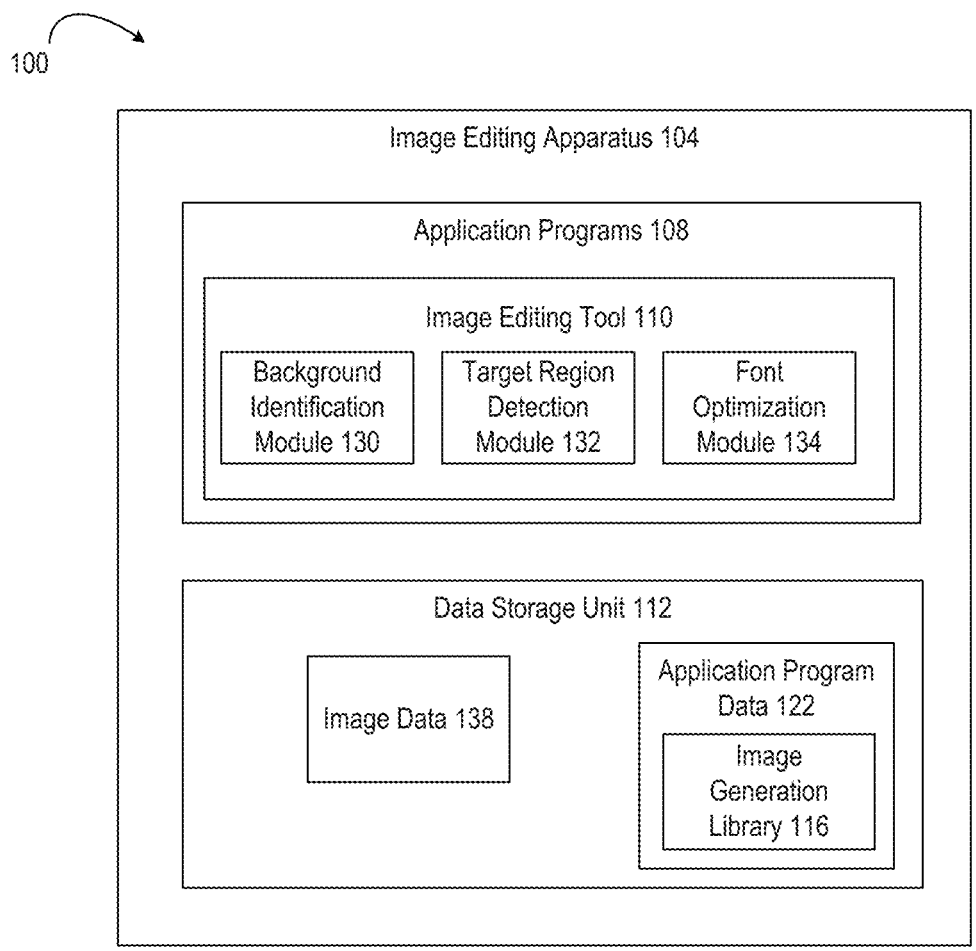
FIG. 1 depicts an example of a computing environment for automatically sizing and placing text within the background of a digital image, according to certain embodiments of the present disclosure.

The present disclosure involves automatically sizing and placing font within identified regions of a digital image background. As explained above, conventional solutions for separating the background of a digital image from the foreground do not include techniques for identifying ideal text placement regions. Certain embodiments described herein improve the performance of digital image editing systems by, for example, using pixel distance measurements to identify the largest region within a digital image background that can accommodate text in a given font. In some embodiments, using these measurement and sizing techniques may greatly reduce image editing time for users and improve the accuracy with which text is sized and placed within an image.

The following non-limiting example is provided to introduce certain embodiments. In this example, an image editing apparatus such as a computing device can identify an image background within a digital image. For instance, the image editing apparatus could execute a segmentation process that classifies one or more image regions as depicting foreground objects and one or more other image regions as depicting a background of the digital image. The image editing apparatus also obtains, using an image generation library, reference font size information of message text to be displayed on the digital image. The reference font size information could include, for example, a message ratio that is a ratio between a text height and width for the message text when rendered with the font type and a test font size. The message text rendered with the font type and a test font size can be used within an algorithm for placing or sizing the message text, prior to updating the digital image to include the message text. For instance, the image editing apparatus renders, but does not display, the message text at with the font type at a test font size (e.g., at a default font size), and determines text height and width information for the message text. The image editing apparatus also determines a message ratio, such as a ratio between text height and text width of the message text as rendered at the test font size. The image editing apparatus uses the reference font size information to guide the placement of appropriately sized text within a target region of the image background.

For instance, continuing with this example, the image editing apparatus detects, within the image background, a target region having proportions suitable for enclosing the message text. The proportions can be suitable for enclosing the message text if, for example, the message text can be rendered at a desired font and font size with neither the height of the message text exceeding the height of the target region nor the width of the message text exceeding the width of the target region. The image editing apparatus also determines a target font size for the message text. The target font size causes the message text, when rendered in the font type at the target font size, to fit within the target region of the image background. For instance, the image editing apparatus could perform an iterative process for incrementing and/or decrementing the font size, where the iteration ceases if the font size results in an aesthetically pleasing message text. The image editing apparatus generates a combined digital image by rendering the message text in the font type at the target font size within the target region of the image background.

Certain embodiments provide improvements over existing software tools for creating digital content in which text is positioned on top of graphical content. For instance, existing software tools require designers, using an editing tool executed on a computer, to manually determine the appropriate size and position for textual content within an image or other graphical content. Manually placing and sizing text in this manner could decrease the utility of editing tools that are used to create digital graphical content, especially if the subjective judgments exercised by users of these editing tools result in text sizes or positions that are aesthetically undesirable. For instance, existing tools rely on a designer's manual effort and subjective judgments to avoid a font size that is too small to be easily seen by a viewer within a background region, a text position or font size that causes the text to exceed the background region and obscure one or more foreground objects, etc. Embodiments described herein can facilitate an automated process for creating digital content that avoids this reliance on subjective, manual determinations by a designer. In this automated process, text is positioned on top of graphical content in accordance with particular rules applied by the computing device in a manner that reduces or eliminates the need for subjective judgments and/or manual efforts involved in prior techniques. For instance, an image editing tool described herein uses various rules that identify a suitable region for text at a particular font, a suitable size for the text at the particular font, or both. A process that applies these rules can rapidly output a suggested text size and placement, which can then be fine-tuned if desired. The particular rules used to automate this process can improve the operation of software tools used to edit digital content, e.g., by reducing the manual effort associated with techniques performed with existing tools, providing improved aesthetic quality as compared to the subjective efforts involved in techniques performed with existing tools, or both.

An Example Operating Environment for Automatic Sizing and Placement of Text

Referring now to the drawings, FIG. 1 depicts an example of an image editing apparatus 104 suitable for performing the automatic sizing and placement of text within an image background. The image editing apparatus 104 executes one or more modules 130-134 (or other suitable program code) of an image editing tool 110 to perform one or more functions used in automatically sizing and placing text input on a digital image.

Digital images may include a variety of image formats capable of being rendered on a computer display. For example, digital images can include JPEG, JPG, PSD, PNG, BMP, and the like. That various embodiments include techniques that may use a variety of background detection techniques, and measure pixels to identify target regions for text placement. Thus, any number of digital image formats may be compatible with the various embodiments described herein.

An application program 108, such as an image editing tool 110, may access an image generation library 116 to obtain data needed to render text in a given font type on or as part of one or more digital images included in image data 138. The image editing tool 110 can be a software application that includes a number of component modules such as background identification module 130, target region detection module 132, and font optimization module 134. Image editing tool 110 may use these component modules to identify portions of a digital image in which text may be placed and then size the text according to a selected font type and the identified regions of the digital image. A font type includes a specific typeface that can be rendered by a computing device executing the image editing tool 110. Examples of font types include "Times New Roman," "Helvetica," "Arial," "Verdana," "Georgia," "Comic Sans," "Papyrus" and the like. The image editing tool 110 generates composite digital images including the original image and the rendered text at the identified position. In some embodiments a new image may be generated. In other embodiments, the text may be rendered as a layer on the existing image.

The image generation library 116 includes a set of program code that is stored in a memory of a computing device, where the program code is executable by processing hardware for performing one or more operations that create or edit graphical content. For instance, an image generation library 116 could include source code for dynamically creating graphical elements (e.g., rendered text having a certain size, a certain color, etc.) for display on an electronic display device. Program code from the image generation library 116 is executable to apply or modify one or more attributes of rendered text, such as color tone, hue, saturation elements, scaling ratios, font type, etc. The image generation library 116 could include a number of individual libraries and may be compiled with the image editing tool 110, or may include separate components that could be invoked by the image editing tool 110, such as software components for applying add-on fonts that may be unavailable at a computing device that executes the image editing tool 110.

Examples of an image editing apparatus 104 include, but are not limited to, a personal computer, a tablet computer, a desktop computer, a processing unit, any combination of these devices, or any other suitable device having one or more processors. A user of the image editing apparatus 104 uses various products, applications, or services supported by the image editing apparatus 104.

The image editing apparatus 104 includes a data storage unit 112. The data storage unit 112 can be implemented as a local storage medium, one or more databases or one or more data servers. The data storage unit 112 includes application program data 122 having an image generation library 116 that is used by the image editing tool 110 and other engines of the image editing apparatus 104, as described in further detail herein. The data storage unit 112 also includes image data 138 such as a repository of digital image files or image project files.

The image editing apparatus 104 hosts one or more application programs 108, which can include the image editing tool 110 and its components, the background identification module 130, target region detection module 132, and font optimization module 134, to facilitate the creation of digital images containing customized text. The image editing apparatus 104 may access the applications (e.g., the image editing tool 110) as a software as a service ("SaaS"), or as a standalone application that is installed on, or as a combination of both.

In one example, an image editing apparatus 104 can access a stored set of images to retrieve a target image. The image editing apparatus 104 may receive user input such as from a keyboard or mouse indicating text to be placed on the digital image, along with an optional font type selection. The image editing tool 110 can access an image generation library 116 that includes one or more font libraries. The image generation library 116 provides the image editing tool 110 with information regarding dimensions and rendering requirements of the font type.

The image editing apparatus 104 executes a background detection algorithm from a background identification module 130 on the digital image to identify portions of the digital image that are background regions. The target region detection module 132 can perform a pixel distance analysis to generate a distance matrix. The distance matrix can include distances, in pixels, from point pixels within the background region to boundary edges. The contents of the distance matrix are distances and thus can be used to define regions of space within the background of the digital image. The image editing apparatus 104 detects one or more target regions of space within the image background based on parameters provided by the user. These parameters may include indications of a specific desired size of font, or simply the largest placement available. The image editing device identifies the target regions that match the parameters.

In this example, the image editing apparatus 104 determines the largest font size in which the text may be rendered within the target regions. For example, if a user selects the "Georgia" font as input, the image editing apparatus 104 uses the information obtained from the image generation library 116 to determine the maximum size at which the text can be rendered. One or more target regions that enable the larger font size rendering are selected, and a composite images including the rendered text within the target regions are generated and displayed to the user for approval.

Examples of Operations for Automatic Sizing and Placement of Text

As described in detail with respect to the various examples below, the image editing tool can perform operations that automatically determine a suitable position and font size for placing given text (e.g., text received via one or more user input devices) on digital images. The operations involve using one or more suitable algorithms, such as existing segmentation processes, to detect a background region within a digital image. For instance, a segmentation process classifies different regions of an image as foreground objects and background objects. In a segmentation process, a foreground object could be an object of interest to a viewer, such as a person standing in a field or a building in a forest. An image segmentation algorithm classifies the object of interest (e.g., the person, the building, etc.) as a foreground object, and also classifies other regions of the image (e.g., the field in which the person is standing, the forest in which the building is placed, etc.) as a background region. If an image region is classified as a background region, then positioning text in that image region is less likely to obscure a foreground object that could be the object of interest to a viewer.

The operations also involve detecting the position and font size to place texts within the given background region. The determined position and font size allow text to be placed in an aesthetically desirable manner. For instance, the text can be positioned in a background region in a manner that fills the background region to the greatest extent feasible without obscuring any foreground objects and/or a particular foreground object (e.g., a foreground object identified via a user input, a foreground object identified via an automatic process as having a higher priority than other foreground objects, etc.).

Figure 2:
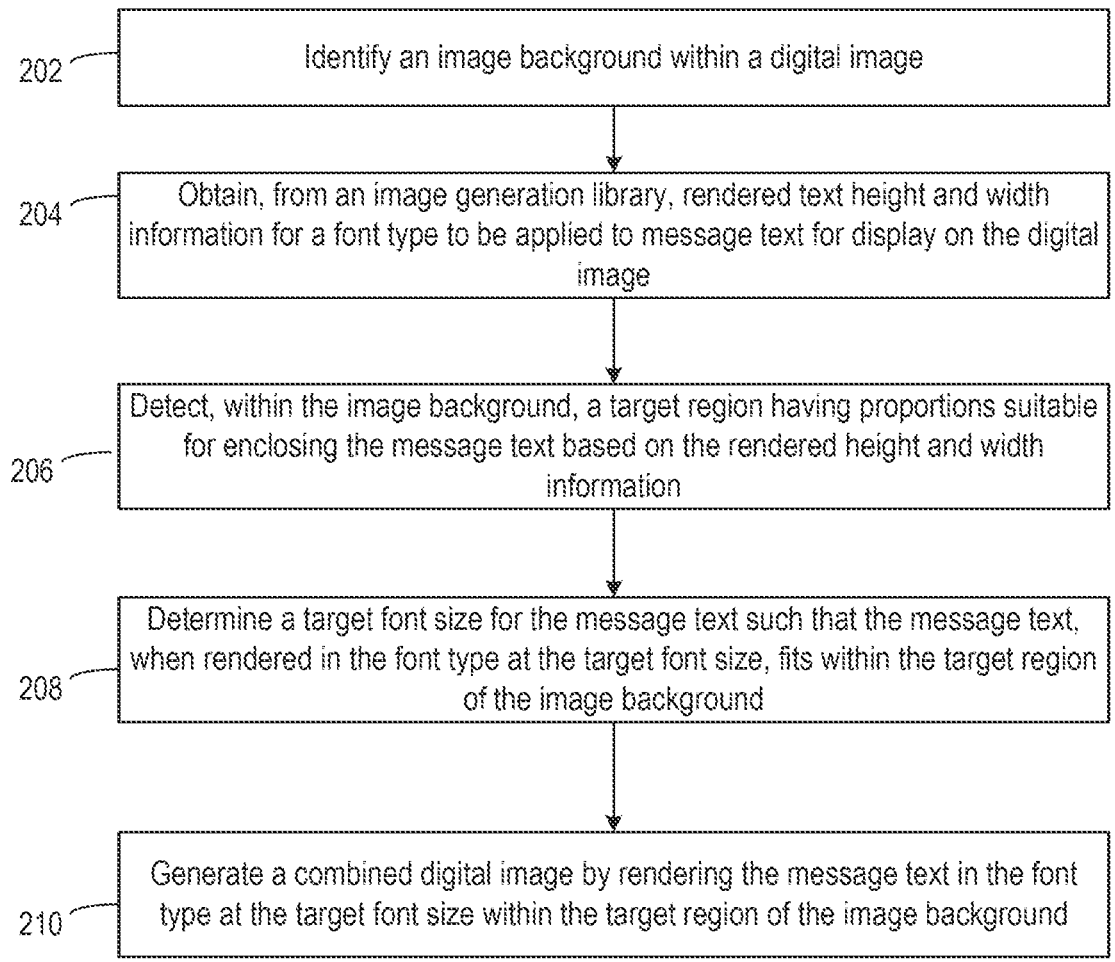
FIG. 2 depicts an example of a process for automatically sizing and placing text within the background of a digital image, according to certain embodiments of the present disclosure.

FIG. 2 depicts an example of a process 200, which may be performed by the image editing apparatus 104 or another suitable computing system, that automatically sizes and places text in a selected font within the background of a digital image. In some embodiments, one or more processing devices implement operations depicted in FIG. 2 by executing suitable program code (e.g., the image editing tool 110). For illustrative purposes, the process 200 is described with reference to certain examples depicted in the figures. Other implementations, however, are possible.

At block 202, the process 200 involves identifying an image background within a digital image. In one example, image data 138 for the digital image size in pixels, color of each pixel, and any additional information needed in order to display the digital image. At least some of the image data 138 for the digital image can describe the relationship between pixels, pixel colors, etc. The image editing tool 110, using background identification module 130, can use machine learning, metadata analysis, pixel analysis, or other techniques to identify the geometry and dimensions of the image background of the digital image. A result of the background region identification is a segmentation mask having (or otherwise indicating) the geometry and dimensions of the background region.

At block 204, the process 200 involves obtaining reference font size information for a font type to be applied to message text for display on the digital image. For instance, the image editing apparatus 104 sends a function call to the image generation library 116 that invokes program code for rendering the input text in a selected font having a test font size. The invoked program code renders the message text with the requested font type and test size. The rendering of the message text at block 204 is performed to provide the reference font size information to the image editing tool 110 for determining a position and/or output size of the message text. For instance, the message text may be rendered at block 204 without updating the digital image or updating a display of the digital image on a display device. The image editing tool 110 access the message text, as rendered, and calculates a message ratio between the height and width of the rendered text to produce a numerical proportion. The image editing tool 110 uses the message ratio to identify target regions within the background region indicated by a segmentation mask.

At block 206, the process 200 involves detecting, within the image background, a target region having proportions suitable for enclosing the message text based on the reference font size information. In one example, image editing tool 110 can use target region detection module 132 to detect regions within a background region that have a ratio equal to the calculated ratio, and in another example, image editing tool 110 can use target region detection module 132 to detect regions within a background region that have a ratio greater than or equal to the calculated ratio. The target region detection module 132 may identify these target regions by calculating, for each pixel in the background region, a distance to each cardinal boundary. For each pixel, a distance to the top, bottom, left, and right boundaries is measured or calculated. This information is stored in a distance matrix.

Distance matrices can be used for text position calculation. For instance, the distance matrix is used by the target region detection module 132 to identify a vertex of a geometric area that has a height to width ratio equal to the calculated ratio of the rendered text or, in some cases, a geometric area that has a height to width ratio that is greater than or equal to the calculated ratio of the rendered text. For illustrative purposes, the target regions are depicted in the figures as rectangular regions, however the shape of the target regions is not limited to rectangular or parallelogram shapes. Pixel distances may be used as radii or other lengths by which to determine a geometrically shaped region that can encompass the rendered text.

In some embodiments, placement parameters may be specified by a user at the beginning of process 200. The placement parameters may constrain the search for one or more target regions by providing rules for selection of geometric regions from the distance matrix. For example, place parameters may include, but are not limited to a proportion of an area of the target region to an area of the image background; a displacement in pixels of the target region from a boundary of the image background; a maximum area of the target region; a minimum area of the target region; or an indication that message text may be placed in an orientation other than horizontal. In some embodiments, a user may select one or more placement parameters, which the image editing tool 110 interprets as a request to produce different versions of the digital image including the text rendered according to the different placement parameters.

In various embodiments, if no placement parameters are specified, then the target region detection module 132 may select the largest of the one or more target regions as the selected target region.

In some embodiments, performance of block 206 can facilitate a reduction in manual effort and an improvement in the aesthetic quality of digital content in which text is positioned on top of graphical content. For instance, block 206 allows for automatically selecting a target region for the message text that avoids the message text exceeding the background region and obscuring one or more foreground objects.

At block 208, the process 200 involves determining a target font size for the message text such that the message text, when rendered in the font type at the target font size, fits within the target region of the image background. The image editing tool 110 may iteratively execute a process via font optimization module 134 to determine the best fit of the text within a selected target region. At each stage of the process, the font optimization module 134 may render the text in the font type at a given size. If the text fits within the target region, then the font optimization module 134 may increase the given font size and render the text again. This process continues until the text exceeds the boundaries of the target region, resulting in the font optimization module 134 selecting the last given font size that did not result in rendered text that exceeded the boundaries of the target region. In additional or alternative embodiments, an initial font size at one iteration of a font-sizing process (e.g., the first iteration) could involve a text height that exceeds a region height and/or a text width that exceeds a region width. In these embodiments, the font optimization module 134 may iteratively decrease the font size (e.g., shrink or reduce the font size for a subsequent iteration) and select a font size fitting the target region as determined from the iterative process. This selected font size is used to generate the composite digital image.

In some embodiments, performance of block 208 can facilitate a reduction in manual effort and an improvement in the aesthetic quality of digital content in which text is positioned on top of graphical content. For instance, block 208, either alone or in combination with block 206, allows for automatically selecting a text size that is appropriate for a target region, in that the text size is neither too small for the message text to be easily seen nor so large that the message text exceeds the target region and obscures one or more foreground objects.

At block 210, the process 200 involves generating a combined digital image by rendering the message text in the font type at the target font size within the target region of the image background. The image editing tool 110 may combine, the rendered text in the selected font size and place it within the selected target region. In some embodiments the resulting image may be left as a layered image. In other embodiments, the rendered text may be flattened into the original image to create a single layer image. In some embodiments, the image editing tool 110 outputs the combined digital image. For instance, the image editing tool 110 renders, at block 210, the combined digital image having the message text for display at a display device and configures the display device to displayed the combined digital image as rendered. Additionally or alternatively, outputting the combined digital image involves saving the combined digital image to a non-transitory computer-readable medium that is accessible by the image editing tool 110 or another program that displays graphical content on a computing device.

Illustrative examples and additional details of the above mentioned operations are described in greater detail with reference to the following figures their accompanying description.

Identification of Digital Image Background Region

Various embodiments can use a variety of existing technologies for background region detection, thus keeping the flexibility of adapting to different user scenarios, while ensuring that the quality (i.e. ensures placed text does not obscuring any foreground objects in the image) at the same time. The process 200 can be applied to multiple Adobe products/solutions to generate images with specified texts placed at proper position in large scale.

Depending on the image format, different approaches can be used for identifying background region within the digital image. Possible approaches include, but are not limited to, machine learning based methods (e.g., Deep Cutout) for bitmap images without further labelling or metadata, as well as metadata-based methods for compositions in Adobe® XD or vector images in Adobe® Illustrator®. The output of this operation is a segmentation mask for the digital image, where the segmentation mask identifies one or more background regions.

Determination of Font Ratio

Before detecting target regions of the background region, the image editing apparatus 104 obtains font height and width information from an image generation library 116 and uses this information to calculate a ratio between the height and width of the font. This step renders given text and uses the actual rendered text to identify the actual print width/height ratio of the text when printed in a single line. A font file is required to render the text and is obtained from the image generation library 116, which may contain a font library. A selected font name can be input by a user at the beginning of process 200 or may be predetermined and stored in a specified configuration file. The width/height ratio of the text is calculated from width and height values in the properties returned from function calls to image generation library 116. The output of this step is a real number representing the width/height ratio of the given text.

Figure 3:
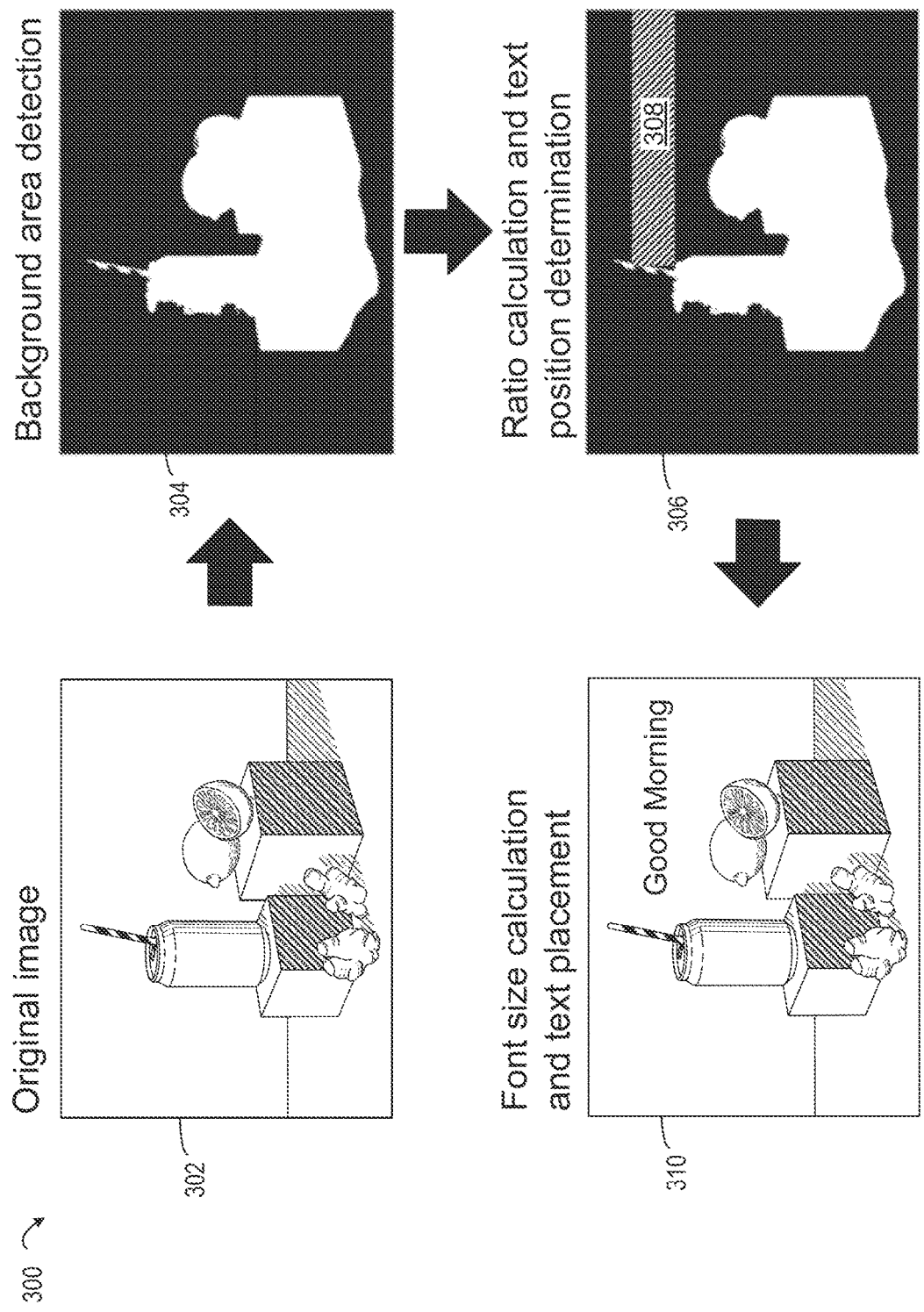
FIG. 3 depicts an example of a digital image in which text is automatically sized and within the background, according to certain embodiments of the present disclosure.

Illustrative examples of the process 200 of FIG. 2 as applied to a digital image are shown in FIG. 3. FIG. 3 depicts an example of a digital image 300 undergoing automatic sizing and placement of text within the background of the image, which may be performed by the image editing apparatus 104 or another suitable computing system. In some embodiments, one or more processing devices implement operations depicted in FIG. 3 by executing suitable program code (e.g., the image editing tool 110). For illustrative purposes, the operations are described with reference to certain examples depicted in the figures. Other implementations, however, are possible.

The digital image 300 is depicted at each stage of the process 200. In image 302, the original image data is shown. This image may be stored in a memory as part of image data 138. This image 302 is the image that is retrieved in preparation for executing the automatic sizing and placement of text.

Image 304 depicts the background region of the image 302. This background region may be the result of block 202 of process 200, in which the background of the digital image is identified. During identification of the background region, it may not be necessary for the processing device to retain the color information for specific pixels of the digital image. That is, only the geometry and dimensions of the background region may be needed, resulting in a solid colored, or uncolored mask.

Image 306 depicts the background region of the image 302 after execution of blocks 204-208 of process 200. For instance, text box 308 is the target region selected after determining a ratio of the selected font height to width (using the information gathered from the image generation library 116). The image editing apparatus 104 may identify one or more target regions having aspect ratios that are equal to (or, in some cases, that are greater than or equal to) the calculated ratio and may select the largest candidate region as the target region. The text may then be rendered in the selected font in an iterative process until the optimal or largest font size is determined. The image editing apparatus 104 may then generate a composite image including the text, rendered at the determined font size in the target region within the background of the digital image, as shown in image 310.

Examples of Operations for Detecting Target Regions

Figure 4:
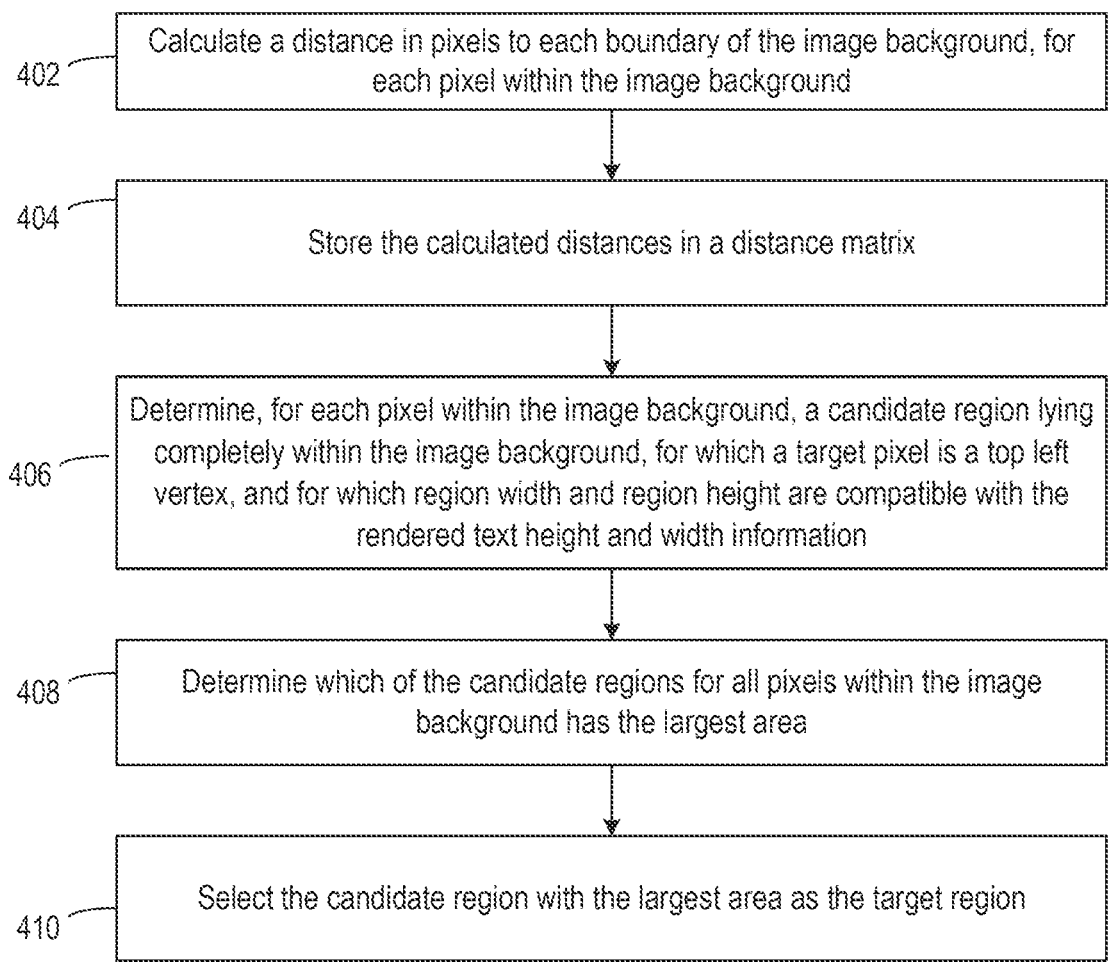
FIG. 4 depicts an example of a process for detecting a target region for placement of text within an image background, according to certain embodiments of the present disclosure.

FIG. 4 depicts an example of a process 400 for identifying one or more target regions for placement of text in a selected font within the background of a digital image. The process 400 can be used to implement block 206 of FIG. 2. The process 400 may be performed by the image editing apparatus 104 or another suitable computing system. In some embodiments, one or more processing devices implement operations depicted in FIG. 4 by executing suitable program code (e.g., the image editing tool 110). For illustrative purposes, the process 400 is described with reference to certain examples depicted in the figures. Other implementations, however, are possible.

At block 402, the process 400 involves calculating a distance in pixels to each boundary of the image background, for each pixel within the image background. For instance, the target region detection module 132 computes boundary distances for background pixels, respectively, where each boundary distance is a respective distance between (i) a respective background pixel from one or more regions in the image background and (ii) a boundary of the one or more background regions. In one example, the target region detection module 132 computes, for each pixel in a background region indicated by a segmentation mask, a distance between the pixel calculate its distances (measured in pixels) to the upper boundary of the background region indicated by a segmentation mask, the lower boundary of the background region indicated by a segmentation mask, left boundary of the background region indicated by a segmentation mask, and the right boundary of the background region indicated by a segmentation mask.

At block 404, the process 400 involves storing the calculated distances in a distance matrix. For instance, the target region detection module 132 retrieves a distance matrix from a data storage unit 112 or otherwise accesses the distance matrix from a data storage unit 112. In one example, each element of a distance matrix corresponds to a respective pixel and is a four-element array. Each element of the four-element array is updated with a distance value identifying a distance between a pixel and a given boundary. For instance, a distance matrix D could have a dimension (m,n), with m rows and n columns, where the matrix element at index $(m_i, n_i)$ is a four-element array for pixel i. The array could be include the values [left-boundary distance, upper-boundary distance, right-boundary distance, lower-boundary distance].

Figure 5:
FIG. 5 depicts an example of pixel distance measurements as part of target region detection, according to certain embodiments of the present disclosure.

FIG. 5 depicts an example of a pixel in a background region 500 along with boundary distances associated with the pixel. The background region 500 is used for target region identification within a digital image background, which may be performed by the image editing apparatus 104 or another suitable computing system. The background region 500 represents a left portion of a background region from image 304. A pixel is shown at the origin of the cross-marks. In this example, a pixel (275, 494) in a background region has a distance of 275 pixels from the left boundary, a distance of 494 pixels from the upper boundary a distance of 880 pixels from the lower boundary, and a distance of 332 pixels from the right boundary. The target region detection module 132 calculates these distances by, for example, counting the number of pixels between a target pixel and a pixel lying along a given boundary.

The target region detection module 132 could therefore update, in the distance matrix, the element at index (275, 494) so that the four-element array in the element includes the values [275, 494, 332, 880]. The measured or calculated pixel distances are added to a distance matrix in which the respective distances between each pixel in the background region and the various boundaries is stored. This distance information along with the distance information of surrounding pixels, is used by the target region detection module 132 of the image editing tool 110 to detect target regions that have proportions suitable for enclosing or encompassing the text when rendered in the selected font type.

Returning to FIG. 4, at block 406, the process 400 involves determining, for each pixel within the image background, a candidate region lying within the image background. For instance, the candidate region could lie completely within the image background, with a target pixel being located a top left vertex, and could have a region width and region height that are compatible with a message ratio from the reference font size information. The target region detection module 132 can implement the block 406 by determining which candidate regions (e.g., rectangle areas) satisfy one or more conditions. The target region detection module 132 stores these candidate regions in a candidate list. To do so, the target region detection module 132 can update a list file in the data storage unit 112 with data identifying a given candidate region. Examples of data in a list file for identifying a given candidate region include data identifying a set of vertices defining the region (e.g., pixel coordinates of the four vertices defining a rectangle), data identifying a particular vertex (e.g., the top-left vertex) along with distance values form the vertex indicating the height and width of the region (e.g., pixel coordinates of pixel $P_i$, a vertical distance from pixel $P_i$ indicating the height, and a horizontal distance from pixel $P_i$ indicating the width), etc.

In some embodiments, the target region detection module 132 can identify a given region of the image background as a candidate region for a given pixel $P_i$ based on the pixel $P_i$ being a certain vertex of the region (e.g., the top-left vertex). The target region detection module 132 can further identify a given region of the image background as a candidate region for a given pixel $P_i$ based on all pixels within the region being inside a background region indicated by a segmentation mask. The target region detection module 132 can further identify a given region of the image background as a candidate region for a given pixel $P_i$ based a width/height ratio of the region being consistent with the message ratio, where both the width and the height of the region are measured in pixels.

In additional or alternative embodiments, a configuration parameter (e.g., an "allow vertical text" flag) may be set within the image editing tool 110. As in the example above, the target region detection module 132 can identify a given region of the image background as a candidate region for a given pixel $P_i$ based on (i) the pixel $P_i$ being a certain vertex of the region (e.g., the top-left vertex) and (ii) all pixels within the region being inside the background region. Furthermore, in these embodiments, the target region detection module 132 implements block 406 by determining, for each pixel within the image background the largest candidate region for which the ratio of the region height to the region width is consistent with an inverse of the message ratio. For instance, the target region detection module 132 can further identify a given region of the image background as a candidate region for a given pixel $P_i$ based a width/height ratio of the region being consistent with an inverse the message ratio, where both the width and the height of the region are measured in pixels.

At block 408, the process 400 involves determining which of the candidate regions for all pixels within the image background has the largest area. For example, the target region detection module 132 retrieves or accesses a list file that has been updated, at block 406, with candidate regions. The target region detection module 132 compares the sizes of the candidate regions, e.g., by computing the size from the data identifying each region and sorting the computed sizes in ascending or descending order.

At block 410, the process 400 involves selecting the candidate region with the largest area as the target region. For example, the target region detection module 132 selects, from the list file retrieved or accessed at block 408, the candidate region having the largest size. The target region detection module 132 returns the selected candidate region. For example, in process 200, the selected candidate region returned at block 410 can be outputted from block 206 and used at block 208.

In some embodiments, the target region detection module 132 performs an algorithm for searching largest target region that is within a background mask area, which can be an irregular shape, and that has given pixel at coordinates (x,y) as a vertex of the target region (e.g., a top left vertex). Such an algorithm can be used to implement a step for computing a target font size for message text such that the message text as rendered fits within a target region of the image background. In the example depicted in Table 1, the target region is rectangular area. But target regions of other shapes may also be used with this algorithm using appropriate modifications. In this example, an input to the algorithm is a distance matrix D, a set of top-left vertex coordinates (top left$_x$, top left$_y$), and a message text's width/height ratio $R_t$, and the output of the algorithm is $A_{max}$ identified by its coordinates of top left vertex and bottom right vertex.

TABLE 1

A-1. Calculate the largest width $W_{max}$ and height $H_{max}$ of available rectangular area, which top left vertex is (topleft$_x$, topleft$_y$). If $W_{max}$ is not larger than already detected overall largest rectangle in a background region indicated by a segmentation mask, the algorithm returns a null value.

A-2. For each pixel with coordinate (j, topleft$_y$), where j is greater than topleft$_x$ and less than or equal to topleft$_x$ + $W_{max}$, iteratively perform operations A-3 to A-6

A-3. Determine whether a valid rectangular area of width/height ratio $R_t$ can be formed by using (topleft$_x$, topleft$_y$) as top-left vertex and (j, topleft$_y$) as the top-right vertex. A valid rectangular area refers to a rectangular area in which all pixels of the rectangular area are in the background region, as determined by the pixels' distances to mask boundaries. If a valid rectangular area can be formed, the algorithm proceeds to A-5; if a valid rectangular area cannot be formed, the algorithm proceeds to A-4.

A-4. Decrease j (e.g., by 1 pixel) and return a rectangular area, which is identified by its top-left vertex (topleft$_x$, topleft$_y$) and bottom-right vertex, (j, topleft$_y$ + ((j − topleft$_x$)/$R_t$)).

A-5. Update the maximum valid rectangle height $H_{max}$ using the latest j by setting $H_{max}$ to the minimum of (i) current $H_{max}$ and (ii) the bottom boundary distance of pixel (j, topleft$_y$).

A-6. If $H_{max}$ is less than the height of an already detected overall largest rectangle in the TABLE 1-continued background region indicated by a segmentation mask, denoted as $H_{max}'$, the algorithm returns a null value. If not, j is increased (e.g., by 1 pixel), and the algorithm returns to A-2.

In some embodiments, the algorithm above can fail rapidly (i.e., can identify an image region that is unsuitable as a target region) on non-promising positions to improve the overall computation efficiency. For instance, one or more of operations A-1 and A-6 can quickly exclude target regions of a background region that are unsuitable for placement of text.

In some embodiments, performance of the process 400 can facilitate a reduction in manual effort and an improvement in the aesthetic quality of digital content in which text is positioned on top of graphical content. For instance, the particular rules applied by the process 400, such as an algorithm depicted in Table 1, automate the selection of a target region for the message text. The rules avoid the selection of target regions in which the message text would exceed a background region and obscure one or more foreground objects.

Additionally or alternatively, using a data structure such as the distance matrix improves the ability of an image editing tool 110 to rapidly place text onto the background region of graphical content in an aesthetically desirable manner (e.g., without obscuring foreground objects). For instance, block 406 of process 400 can involve a determination of a candidate region for each pixel within an image background, and the algorithm depicted in Table 1 can involve searching for valid regions as determined by each pixel's distance to one or more mask boundaries. Using these per-pixel determinations increases the precision with which a target region is identified, thereby providing an improvement over subjective judgements of designers used in existing tools. However, such per-pixel determinations would be impractical if implemented outside of a computing environment, since a designer would likely opt for a subjective judgment regarding text placement rather than an extensive calculation of various pixel distances for each potential target region. But maintaining distance measurements for each pixel in a distance matrix, which can be quickly referenced by a processing device that executes the process 400, allows for rapid identification of relevant pixel distances at block 406 (i.e., reduces manual effort that might discourage designers), which in turn the image editing tool 110 to perform the region-selection provided by block 406 with increased precision as compared to subjective determinations by designers.

Examples of Operations for Optimizing Font Sizing

Figure 6:
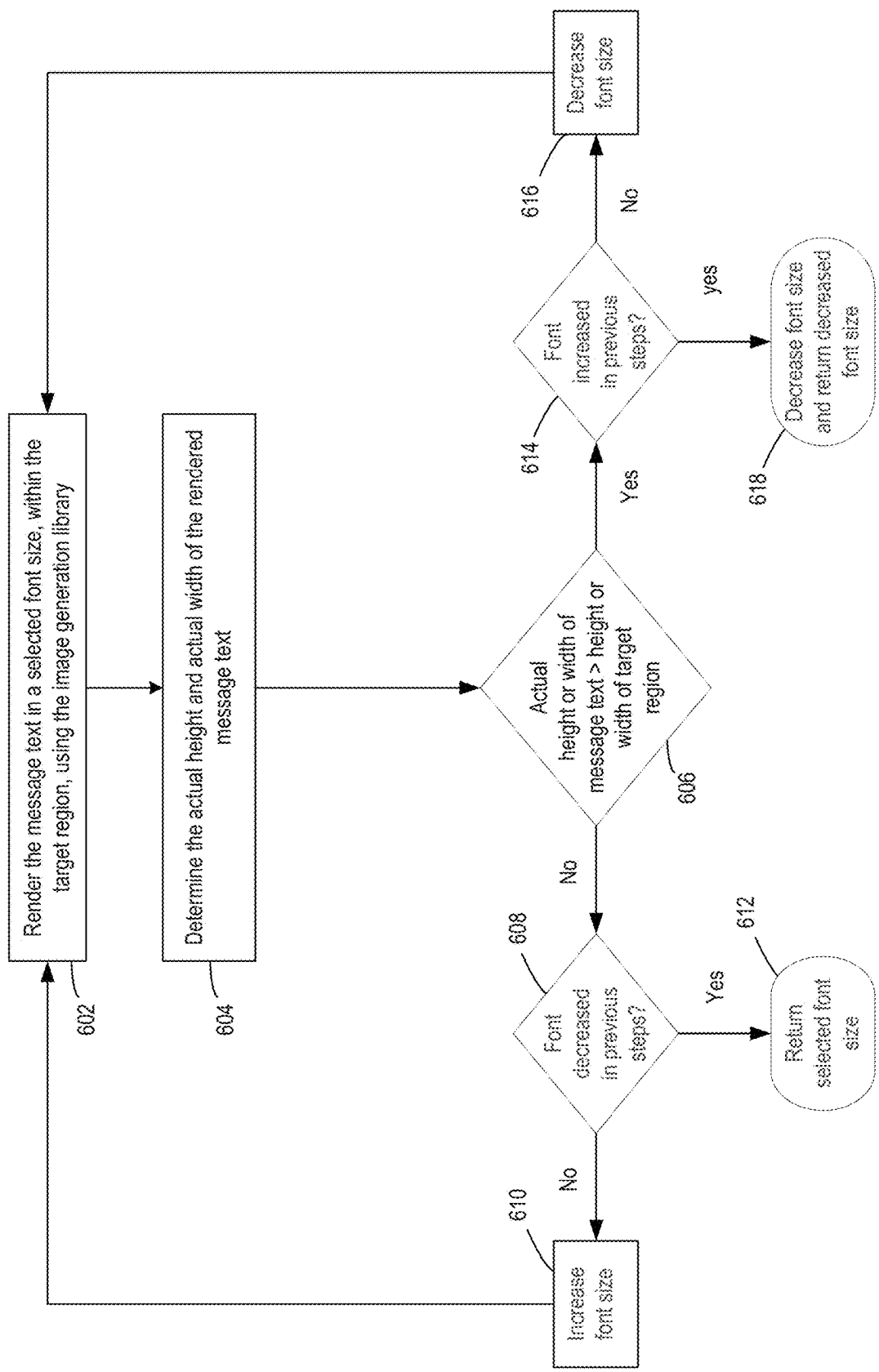
FIG. 6 depicts an example of a process for determining a target font size for placement within a target region of a digital image background, according to certain embodiments of the present disclosure.

FIG. 6 depicts an example of a process 600 for determining a size of text in a selected font to be rendered within the background of a digital image. The process 600 could be used, for example, to implement block 208 from FIG. 2. In some embodiments, the process 600 is performed iteratively. This iteration is completed by selecting a font size for use in rendering the text within the digital image.

The process 600 may be performed by the image editing apparatus 104 or another suitable computing system. In some embodiments, one or more processing devices implement operations depicted in FIG. 6 by executing suitable program code (e.g., the image editing tool 110). For illustrative purposes, the process 600 is described with reference to certain examples depicted in the figures. Other implementations, however, are possible.

At block 602, the process 600 involves rendering the message text in a selected font size, within the target region, using the image generation library. For instance, the font optimization module 134 accesses one or more image creation libraries from a data storage unit 112. The font optimization module 134 executes code from an image creation library to render message text in a specified font having an initial size (i.e., a default font size). In some embodiments, the font optimization module 134 pads the message text on both ends with one or more single spaces. In one example, the font optimization module 134 renders the message text, which can be padded, at the selected font size in a single line within a determined rectangle area. In other examples, the font optimization module 134 renders the message text at the selected font size in a set of n lines within a determined rectangle area, where n can be identified to the image editing tool 110 via one or more user inputs.

At block 604, the process 600 involves determining the actual height and actual width of the rendered message text. For instance, the font optimization module 134 calculates, measures, or otherwise determines the height of the rendered message text, where the height is a number of pixels between outermost pixels of the rendered text in a vertical direction. The font optimization module 134 also calculates, measures, or otherwise determines the width of the rendered message text, where the height is a number of pixels between outermost pixels of the rendered text in a horizontal direction.

At block 606, the process 600 involves determining whether one or more of the actual height or the actual width of the message text is greater than the height or the width of the target region. To do so, the font optimization module 134 compares the height computed at block 604 to the height of the target region, and compares the width computed at block 604 to the width of the target region.

If the actual height of the message text is not greater than the height of the target region and the actual width of the message text is not greater than the width of the target region, the process 600 involves the font optimization module 134 determining whether the font size has been decreased from a previous iteration, as depicted at block 608. If not, the font optimization module 134 selects a different font size that is larger than the selected font size at a current iteration. For instance, the font optimization module 134 can increase the font size by one point. The font optimization module 134 performs another iteration by returning to block 602. If the font size has been decreased from a previous iteration, the font optimization module 134 returns the selected font size as a target font size, which can be outputted at block 208 of the process 200 and used in block 210 of the process 200.

If one or more of the actual height or the actual width of the message text is greater than the height or the width of the target region, the process 600 involves the font optimization module 134 determining whether the font size has been increased from a previous iteration, as depicted at block 614. If not, the font optimization module 134 selects a different font size that is smaller than the selected font size at a current iteration. For instance, the font optimization module 134 can decrease the font size by one point. The font optimization module 134 performs another iteration by returning to block

602. If the font size has been increased from a previous iteration, the font optimization module 134 decreases the selected font size (e.g., by reducing the selected font size by one point) and returns the decreased font as the target font size, which can be outputted at block 208 of the process 200 and used in block 210 of the process 200.

In some embodiments, performance of the process 600 can facilitate a reduction in manual effort and an improvement in the aesthetic quality of digital content in which text is positioned on top of graphical content. For instance, process 600, either alone or in combination with the process 400, allows for automatically selecting a text size that is appropriate for a target region, in that the text size is neither too small for the message text to be easily seen nor so large that the message text exceeds the target region and obscures one or more foreground objects.

Examples of Composite Images with Varied Text Placement

Figure 7:
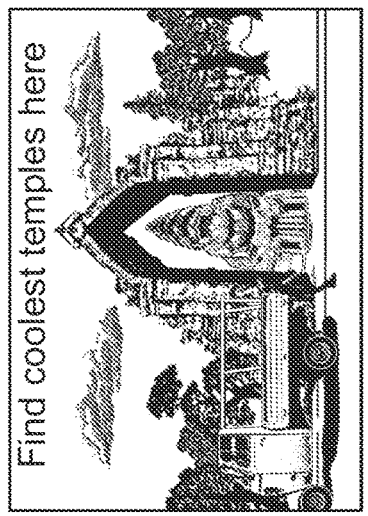
FIG. 7 depicts examples of text placement within the background of a digital image, according to certain embodiments of the present disclosure.
Figure 7:
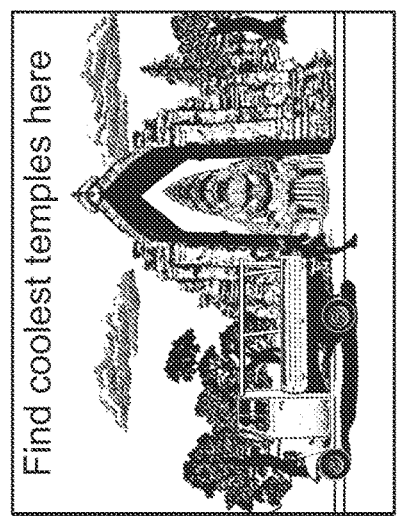
Figure 7:
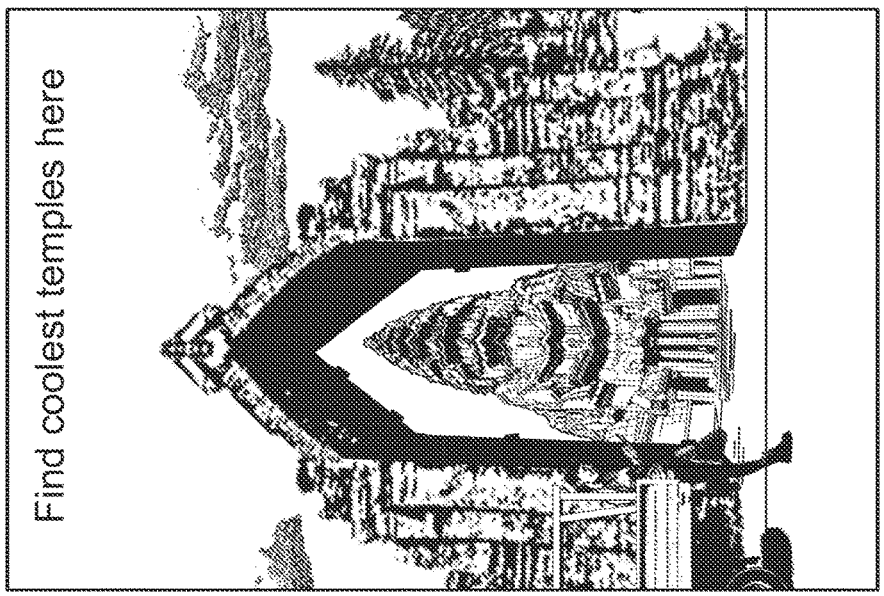
Figure 7:
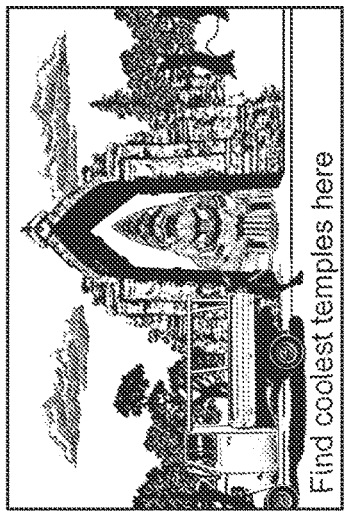
Figure 7:

FIG. 7 depicts an example of digital images created using automatic sizing and placement of text within the background of the image, which may be performed by the image editing apparatus 104 or another suitable computing system. In some embodiments, one or more processing devices implement operations depicted in FIG. 7 by executing suitable program code (e.g., the image editing tool 110). For illustrative purposes, the operations are described with reference to certain examples depicted in the figures. Other implementations, however, are possible.

The illustrative examples depicted in FIG. 7 demonstrate how the manipulation of an original digital image to reduce the size of modify the geometry of the background region can impact automatic sizing and placement of text. For instance, the process 200 of FIG. 2 may be used to generate an image 702 from an original image (i.e., an image of the same scene without the text "Find coolest temples here") by determining that the top of the image is the best place to place the text because this is the largest target region within the background region. Alternatively, a user may have specified a placement parameters indicating that text should be placed in a target region near the top of the image if possible. There are no clouds at the very top of the image 702, making this a large region of background region, in which text is unlikely to overlap foreground elements.

In image 704, the sky has been partially cropped from the image leaving very little free space in the background of the upper portion of the image. As such, the process 200 may determine that the largest target region suitable for encompassing the text is at the bottom of the image. Alternatively, the user may have selected a placement parameters indicating that target regions located near the bottom of the image or surrounded by dark colors, should be selected as the target region.

In image 706, the bottom of the image is cropped out, and more sky is available at the top of the image. Although the text overlaps some cloud layer, the process 200 may have determined that this was the largest target region in which text could be placed. In some embodiments, users may be able a placement parameter indicating that partial obscuring of objects in the background is acceptable, so long as foreground objects are not obscured.

Images 708 and 710 illustrate how zooming in or out on focal points of the image can impact the placement of text within the background of the image. Although both images are the same size, the text size and placement differs between image 708 and 710 due to zoom or magnification.

As the illustrative examples show, users may be able to quickly toggle or manipulate the likely placement of text within a digital image by cropping, resizing, or magnifying the image, without having to perform any manual adjustment of text. In this way, the various techniques may greatly reduce time spent on text sizing and placement and improve deficiency of digital image generation.

Example of a Computing System for Editing Digital Images

Figure 8:
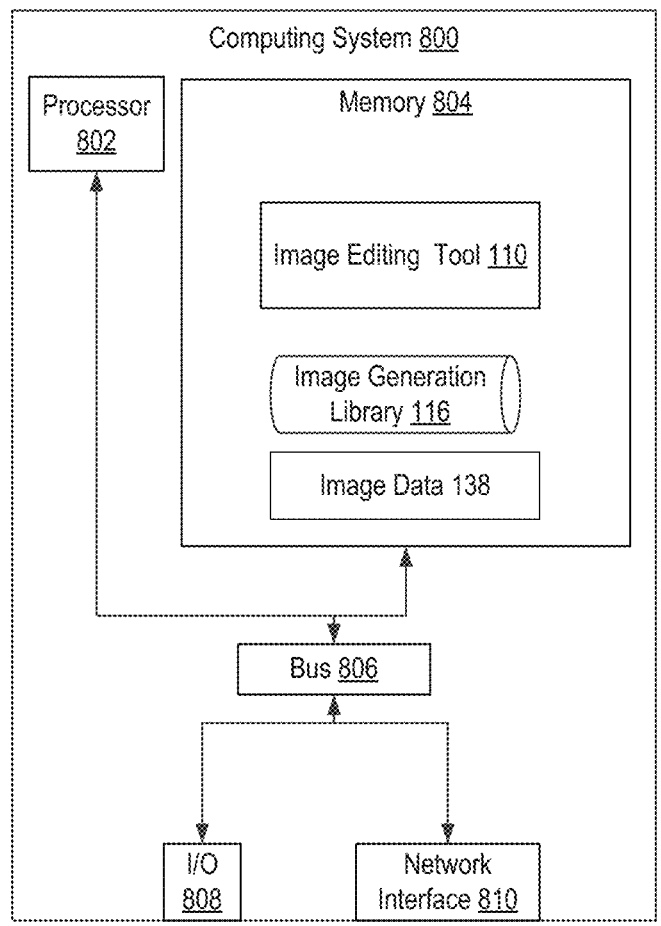
FIG. 8 depicts an example of a computing system that performs certain operations described herein, according to certain embodiments of the present disclosure.

Any suitable computing system or group of computing systems can be used for performing the operations described herein. For example, FIG. 8 depicts an example of computing system 800 that executes an image editing tool 110 or one or more modules therein depicted in FIG. 1.

The depicted example of a computing system 800 includes a processor 802 communicatively coupled to one or more memory devices 804. The processor 802 includes one or more hardware devices that execute computer-executable program code stored in a memory device 804, access information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the image editing tool 110 and/or one or more component modules depicted in FIG. 1. The program code could also include other suitable applications that perform one or more operations described herein. The program code may be resident in the memory device 804 or any suitable computer-readable medium and may be executed by the processor 802 or any other suitable processor.

The computing system 800 can access one or more of the image generation library 116 and the image data 138 in any suitable manner. In some embodiments, some or all of one or more of these data sets, models, and functions are stored in the memory device 804, as in the example depicted in FIG. 8. For example, a computing system 800 that executes the image editing tool 110 can provide access to the image generation library 116 and the image data 138.

In additional or alternative embodiments, one or more of these data sets, models, and functions are stored in the same memory device (e.g., one of the memory device 804). For example, a common computing system, such as the image editing apparatus 104 depicted in FIG. 1, can host the image editing tool 110 and its subcomponents as well as the image generation library 116 and the image data 138. In additional or alternative embodiments, one or more of the programs, data sets, models, and functions described herein are stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices (e.g., a computing device executing a relationship management tool 80) via a data network using the network interface device 810.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
   identifying an image background within a digital image;
   obtaining, from an image generation library, reference font size information for a font type to be applied to message text for display on the digital image, wherein the reference font size information includes a message ratio that is a ratio between a height and a width of the message text as rendered at a test font size;
   detecting, within the image background, a target region having proportions that enclose the message text based on the reference font size information;
   determining a target font size for the message text such that the message text, when rendered in the font type at the target font size, fits within the target region of the image background; and
   generating a combined digital image by rendering the message text in the font type at the target font size within the target region of the image background.

2. The method of claim 1, wherein detecting within the image background, the target region having proportions that enclose the message text comprises:
   determining calculated distances by calculating, for each pixel within the image background, a respective distance in pixels to each boundary of the image background;
   storing the calculated distances in a distance matrix;
   determining, for each pixel within the image background, a candidate region lying completely within the image background, for which a target pixel is a top left vertex, and for which region width and region height are compatible with the reference font size information;
   determining which of the candidate regions for all pixels within the image background has a largest area; and
   selecting the candidate region with the largest area as the target region.

3. The method of claim 2, further comprising:
   calculating the message ratio from the height and the width of the message text as rendered at the test font size; and
   wherein determining, for each pixel within the image background, the candidate region lying completely within the image background, for which the target pixel is the top left vertex, and for which the region height and the region width are compatible with the reference font size information comprises determining, for each pixel within the image background, a largest candidate region for which a ratio of the region height to the region width is consistent with the message ratio.

4. The method of claim 3, wherein determining, for each pixel within the image background, the candidate region lying completely within the image background comprises:

determining, for each pixel within the image background, the largest candidate region for which the ratio of the region height to the region width is consistent with an inverse of the message ratio;

determining, for each pixel within the image background, whether the largest candidate region consistent with the message ratio is bigger than a largest candidate region consistent with the inverse of the message ratio; and selecting the determined largest candidate region as a largest region for the pixel.

5. The method of claim 1, wherein detecting, within the image background, the target region having proportions that enclose the message text based on the reference font size information is based on placement parameters including one or more of:

a proportion of an area of the target region to an area of the image background, a displacement in pixels of the target region from a boundary of the image background, a maximum area of the target region, a minimum area of the target region, or an indication that message text may be placed in an orientation other than horizontal.

6. The method of claim 1, wherein determining the target font size for the message text comprises:

iteratively performing:
rendering the message text in a default font size, within the target region, using the image generation library;

calculating an actual height and an actual width of the message text as rendered;

determining whether one or more of the actual height or the actual width of the message text is greater than a height or a width of the target region; and performing one of:
in response to determining that one or more of the actual height or the actual width of the message text is greater than the height or the width of the target region, modifying a font size for the message text and performing another iteration of rendering, calculating, and determining, or exiting the iteration in response to determining that neither the actual height nor the actual width of the message text is greater than the height or the width of the target region.

7. The method of claim 6, further comprising selecting a current font size as the target font size in response to determining that neither the actual height nor the actual width of the message text is greater than the height or the width of the target region.

8. The method of claim 1, further comprising a step for computing the target font size for the message text such that the message text, as rendered, fits within the target region of the image background.

9. A computing system comprising:
a processing device; and
a non-transitory computer-readable medium communicatively coupled to the processing device,
wherein the processing device is configured for executing code stored in the non-transitory computer-readable medium and thereby performing operations comprising:
identifying an image background within a digital image,
obtaining, from an image generation library, reference font size information for a font type to be applied to message text for display on the digital image, wherein the reference font size information includes a message ratio that is a ratio between a height and a width of the message text as rendered at a test font size, detecting, within the image background, a target region having proportions that enclose the message text based on the reference font size information, determining a target font size for the message text such that the message text, when rendered in the font type at the target font size, fits within the target region of the image background, and generating a combined digital image by rendering the message text in the font type at the target font size within the target region of the image background.

10. The computing system of claim 9, wherein detecting within the image background, the target region having proportions that enclose the message text comprises:

determining calculated distances by calculating, for each pixel within the image background, a respective distance in pixels to each boundary of the image background;

storing the calculated distances in a distance matrix;

determining, for each pixel within the image background, a candidate region lying completely within the image background, for which a target pixel is a top left vertex, and for which region width and region height are compatible with the reference font size information;

determining which of the candidate regions for all pixels within the image background has a largest area; and selecting the candidate region with the largest area as the target region.

11. The computing system of claim 10, further comprising:

calculating the message ratio from the height and the width of the message text as rendered at the test font size; and wherein determining, for each pixel within the image background, the candidate region lying completely within the image background, for which the target pixel is the top left vertex, and for which the region height and the region width are compatible with the reference font size information comprises determining, for each pixel within the image background, a largest candidate region for which a ratio of the region height to the region width is consistent with the message ratio.

12. The computing system of claim 11, wherein determining, for each pixel within the image background, the candidate region lying completely within the image background comprises:

determining, for each pixel within the image background, the largest candidate region for which the ratio of the region height to the region width is consistent with an inverse of the message ratio;

determining, for each pixel within the image background, whether the largest candidate region consistent with the message ratio is bigger than a largest candidate region consistent with the inverse of the message ratio; and selecting the determined largest candidate region as a largest region for the pixel.

13. The computing system of claim 9, wherein detecting, within the image background, the target region having proportions that enclose the message text based on the reference font size information is based on placement parameters including one or more of:

a proportion of an area of the target region to an area of the image background, a displacement in pixels of the target region from a boundary of the image background, a maximum area of the target region,
a minimum area of the target region, or
an indication that message text may be placed in an orientation other than horizontal.

14. The computing system of claim 9, wherein determining the target font size for the message text comprises:
iteratively performing:
rendering the message text in a default font size, within the target region, using the image generation library;
calculating an actual height and an actual width of the message text as rendered;
determining whether one or more of the actual height or the actual width of the message text is greater than a height or a width of the target region; and
performing one of:
in response to determining that one or more of the actual height or the actual width of the message text is greater than the height or the width of the target region, modifying a font size for the message text and performing another iteration of rendering, calculating, and determining, or
exiting the iteration in response to determining that neither the actual height nor the actual width of the message text is greater than the height or the width of the target region.

15. A non-transitory computer-readable medium having program code stored thereon that, when executed by a processing device, causes the processing device to perform operations comprising:
identifying an image background within a digital image;
obtaining, from an image generation library, reference font size information for a font type to be applied to message text for display on the digital image, wherein the reference font size information includes a message ratio that is a ratio between a height and a width of the message text as rendered at a test font size;
detecting, within the image background, a target region having proportions that enclose the message text based on the reference font size information;
determining a target font size for the message text such that the message text, when rendered in the font type at the target font size, fits within the target region of the image background; and
generating a combined digital image by rendering the message text in the font type at the target font size within the target region of the image background.

16. The non-transitory computer-readable medium of claim 15, wherein detecting within the image background, the target region having proportions that enclose the message text comprises:
determining calculated distances by calculating, for each pixel within the image background, a respective distance in pixels to each boundary of the image background;
storing the calculated distances in a distance matrix;
determining, for each pixel within the image background, a candidate region lying completely within the image background, for which a target pixel is a top left vertex, and for which region width and region height are compatible with the reference font size information;
determining which of the candidate regions for all pixels within the image background has a largest area; and
selecting the candidate region with the largest area as the target region.

17. The non-transitory computer-readable medium of claim 16, further comprising:
calculating the message ratio from the height and the width of the message text as rendered at the test font size; and
wherein determining, for each pixel within the image background, the candidate region lying completely within the image background, for which the target pixel is the top left vertex, and for which the region height and the region width are compatible with the reference font size information comprises determining, for each pixel within the image background, a largest candidate region for which a ratio of the region height to the region width is consistent with the message ratio.

18. The non-transitory computer-readable medium of claim 17, wherein determining, for each pixel within the image background, the candidate region lying completely within the image background comprises:
determining, for each pixel within the image background, the largest candidate region for which the ratio of the region height to the region width is consistent with an inverse of the message ratio;
determining, for each pixel within the image background, whether the largest candidate region consistent with the message ratio is bigger than a largest candidate region consistent with the inverse of the message ratio; and
selecting the determined largest candidate region as a largest region for the pixel.

19. The non-transitory computer-readable medium of claim 15, wherein detecting, within the image background, the target region having proportions that enclose the message text based on the reference font size information is based on placement parameters including one or more of:
a proportion of an area of the target region to an area of the image background,
a displacement in pixels of the target region from a boundary of the image background,
a maximum area of the target region,
a minimum area of the target region, or
an indication that message text may be placed in an orientation other than horizontal.

20. The non-transitory computer-readable medium of claim 15, wherein determining the target font size for the message text comprises:
iteratively performing:
rendering the message text in a default font size, within the target region, using the image generation library;
calculating an actual height and an actual width of the message text as rendered;
determining whether one or more of the actual height or the actual width of the message text is greater than a height or a width of the target region; and
performing one of:
in response to determining that one or more of the actual height or the actual width of the message text is greater than the height or the width of the target region, modifying a font size for the message text and performing another iteration of rendering, calculating, and determining, or
exiting the iteration in response to determining that neither the actual height nor the actual width of the message text is greater than the height or the width of the target region.

\* \* \* \* \*